United States Patent
Fischer et al.

(10) Patent No.: US 8,637,719 B2
(45) Date of Patent: Jan. 28, 2014

(54) CATALYST COMPRISING PALLADIUM AND ITS APPLICATION IN SELECTIVE HYDROGENATION

(75) Inventors: Lars Fischer, Vienne (DE); Carine Petit-Clair, Jardin (FR); Cecile Thomazeau, Lyons (FR); Lois Sorbier, Seyssuel (FR); Catherine Verdon, Vaulx-en-Velin (FR)

(73) Assignee: IFP Energies nouvelles, Reuil-Malmaison Cedex (FR)

( * ) Notice: Subject to any disclaimer, the term of this patent is extended or adjusted under 35 U.S.C. 154(b) by 601 days.

(21) Appl. No.: 12/740,240
(22) PCT Filed: Oct. 24, 2008
(86) PCT No.: PCT/FR2008/001506
§ 371 (c)(1), (2), (4) Date: Apr. 28, 2010
(87) PCT Pub. No.: WO2009/092879
PCT Pub. Date: Jul. 30, 2009

(65) Prior Publication Data
US 2010/0236986 A1    Sep. 23, 2010

(30) Foreign Application Priority Data
Oct. 29, 2007  (FR) ..................... 07 07699

(51) Int. Cl.
| C07C 5/00 | (2006.01) |
|---|---|
| C07C 5/13 | (2006.01) |
| C07C 2/00 | (2006.01) |
| C07C 27/00 | (2006.01) |
| C07C 27/06 | (2006.01) |
| B01J 23/00 | (2006.01) |
| B01J 21/00 | (2006.01) |

(52) U.S. Cl.
USPC ........... 585/250; 585/700; 585/734; 585/750; 502/250; 502/251; 502/252; 502/262; 502/263; 502/327; 502/328; 502/330; 502/332; 502/333; 502/339; 502/341; 502/344; 502/355; 502/415; 502/439; 518/728

(58) Field of Classification Search
USPC ......... 502/250–252, 262, 263, 327, 328, 330, 502/332, 333, 339, 341, 344, 355, 415, 502/439; 518/728; 585/250, 700, 734, 750
See application file for complete search history.

(56) References Cited

U.S. PATENT DOCUMENTS 5,648,576 A  * 7/1997  Nguyen Than et al. ...... 585/260
5,889,187 A  * 3/1999  Nguyen Than et al. ...... 585/260
(Continued)

FOREIGN PATENT DOCUMENTS

EP    0715889 A2   6/1996
EP    0715889 W    6/1996
(Continued)

Primary Examiner — Cam N. Nguyen
(74) Attorney, Agent, or Firm — Millen, White, Zelano & Branigan, P.C.

(57) ABSTRACT

The invention concerns a catalyst comprising a porous support, palladium, at least one metal selected from the group constituted by alkalis and alkaline-earths, in which:
- the specific surface area of the porous support is in the range 50 to 210 m²/g;
- the palladium content in the catalyst is in the range 0.05% to 2% by weight;
- at least 80% by weight of the palladium is distributed in a crust at the periphery of the support, the thickness of said crust being in the range 20 to 200 μm;
- the metallic dispersion D is in the range 25% to 70%;
- the density of the palladium particles in the crust is in the range 1500 to 4100 particles of palladium per μm²;
- and said alkali and/or alkaline-earth metal is distributed homogeneously across the support.

The invention also concerns the preparation of the catalyst and its use in selective hydrogenation.

14 Claims, 1 Drawing Sheet

(56) References Cited

U.S. PATENT DOCUMENTS

| | | | | |
|---|---|---|---|---|
| 6,054,409 | A * | 4/2000 | Nguyen Thanh et al. | 502/330 |
| 6,498,280 | B1 * | 12/2002 | Uzio et al. | 585/654 |
| 6,528,453 | B2 * | 3/2003 | Baker et al. | 502/325 |
| 6,534,438 | B1 * | 3/2003 | Baker et al. | 502/325 |
| 6,596,243 | B1 * | 7/2003 | Fujii et al. | 422/177 |
| 6,806,382 | B2 * | 10/2004 | Baker et al. | 560/245 |
| 7,491,674 | B2 * | 2/2009 | Fujii et al. | 502/340 |
| 7,521,393 | B2 * | 4/2009 | Blankenship et al. | 502/330 |
| 7,569,510 | B2 * | 8/2009 | Deevi et al. | 502/240 |
| 7,605,108 | B2 * | 10/2009 | Wakamatsu et al. | 502/326 |
| 7,851,405 | B2 * | 12/2010 | Wakamatsu et al. | 502/332 |

FOREIGN PATENT DOCUMENTS

| | | |
|---|---|---|
| EP | 0979673 A1 | 2/2000 |
| EP | 0979673 W | 2/2000 |
| WO | PCTFR2008001506 R | 10/2008 |

* cited by examiner

CATALYST COMPRISING PALLADIUM AND ITS APPLICATION IN SELECTIVE HYDROGENATION

The selective hydrogenation process can transform polyunsaturated compounds from oil cuts by conversion of the most unsaturated compounds into the corresponding alkenes, avoiding complete saturation and thus the formation of the corresponding alkanes.

The aim of the invention is to propose a catalyst with improved performance and a process for the selective hydrogenation of unsaturated hydrocarbon compounds present in the hydrocarbon cuts, preferably cuts from steam cracking or from catalytic cracking.

PRIOR ART

Catalysts for selective hydrogenation of such cuts are often based on palladium, in the form of small metallic particles deposited on a support which may be a refractory oxide in the form of beads, extrudates, trilobes or forms having other geometries. Their palladium content and the size of the palladium particles form part of the criteria which are of importance to the activity and selectivity of the catalysts.

The macroscopic distribution of the metallic particles in the support also constitutes an important criterion, principally in the context of rapid and consecutive reactions such as selective hydrogenations. In general, such elements have to be located in a crust at the periphery of the support in order to prevent problems with the transfer of intragranular material which could result in defective activity and a loss of selectivity.

The aim of the present invention is to obtain catalysts with a catalytic activity which is higher than that of prior art catalysts.

The catalysts of the invention comprise, inter alia, a crust formed by palladium particles. They have palladium dispersions in the range 25% to 70% and palladium particle densities in the range 1500 to 4100 particles of palladium per $\mu m^2$ (denoted Pd/$\mu m^2$). They also comprise an alkali or alkaline-earth compound which is homogeneously distributed within the support grain.

In the prior art, the palladium particle density is calculated for catalysts in which the palladium is distributed in the crust.

U.S. Pat. No. 5,929,261 describes catalysts comprising a maximum 5 $\mu m$ crust of metals. Those catalysts are obtained by impregnation or spraying metallic sols onto hot supports. The catalyst of Example 1 is a palladium on alumina catalyst comprising 0.05% by weight of palladium, the BET surface area of the alumina being 290 $m^2/g$. Depending on the mode of preparation employed, the sizes of the palladium particles are in the range 2 to 4 nm and the alumina spheres have a diameter in the range 1.5 to 4 mm. This produces a palladium particle density in the range 200 to 6600 particles of Pd/$\mu m^2$.

U.S. Pat. No. 4,484,015 describes, inter alia, monometallic palladium catalysts comprising a 300 $\mu m$ crust of palladium. Example 1 corresponds to a catalyst comprising 0.017% by weight of palladium. That catalyst is obtained by impregnation of an acid solution of palladium onto 6 $m^2/g$ alpha alumina spheres with a 4 mm diameter. Depending on the mode of preparation employed, the Pd nanoparticles are in the range 2.5 to 4 mm in size. This produces a palladium particle density in the range 170 to 750 particles of Pd/$\mu m^2$.

Patent EP-0 884 102 describes, inter alia, catalysts comprising palladium, with a deposit at the periphery of beads of the support over a depth of 80% or less of the radius, optionally in combination with a promoter such as molybdenum or tungsten. Example 1 corresponds to the preparation of a monometallic catalyst comprising 0.35% by weight of palladium. The preparation is carried out by impregnation of a solution of palladium nitrate onto alumina beads with a BET surface area of 35 $m^2/g$ and a mean diameter of 3 mm. Depending on the mode of preparation employed, the palladium nanoparticles are in the range 4 to 4.5 $\mu m$ in size. This produces a palladium particle density in the range 150 to 250 particles of Pd/$\mu m^2$.

SUMMARY OF THE INVENTION

The invention concerns a catalyst comprising a porous support, palladium, and at least one metal selected from the group constituted by alkalis and alkaline-earths, in which:
- the specific surface area of the porous support is in the range 50 to 210 $m^2/g$;
- the palladium content in the catalyst is in the range 0.05% to 2% by weight;
- at least 80% by weight of the palladium is distributed in a crust at the periphery of the support, the thickness of said crust being in the range 20 to 200 $\mu m$;
- the metallic dispersion D is in the range 25% to 70%;
- the density of the palladium particles in the crust is in the range 1500 to 4100 particles of palladium per $\mu m^2$;
- and said alkali and/or alkaline-earth metal is distributed homogeneously across the support.

The invention also concerns the preparation of the catalyst and its use in selective hydrogenation.

DETAILED DESCRIPTION OF THE INVENTION

Characteristics of Catalyst

The present invention concerns catalysts with improved catalytic activity.

It concerns catalysts comprising:
- palladium;
- at least one metal selected from the group constituted by alkalis and alkaline-earths;
- a porous support comprising at least one refractory oxide selected from the group constituted by silica, alumina and silica-alumina; more preferably, the porous support is alumina;

in which:
- the specific surface area of the porous support is in the range 50 to 210 $m^2/g$, preferably in the range 100 to 160 $m^2/g$, more preferably in the range 120 to 150 $m^2/g$;
- the quantity of palladium in the catalyst is in the range 0.05% to 2% by weight, preferably in the range 0.1% to 0.8% by weight;
- at least 80% by weight of the palladium is distributed in a crust at the periphery of the support, the thickness of said crust being in the range 20 to 200 $\mu m$, preferably in the range 20 to 120 $\mu m$, more preferably in the range 20 to 110 $\mu m$;
- the metallic dispersion D is in the range 25% to 70%, preferably in the range 35% to 60%;
- the palladium particle density in the crust, denoted De (defined below) is in the range 1500 to 4100 particles of palladium per $\mu m^2$, preferably in the range 1550 to 4000 particles of palladium per $\mu m^2$, preferably in the range 1600 to 3950 particles of palladium per $\mu m^2$;
- the sum of the quantities of alkali and/or alkaline-earth metal in the catalyst is in the range 0.05% to 5% by weight, more preferably in the range 0.1% to 2% by weight;

the alkali and/or alkaline-earth metal is distributed homogeneously across the support with a coefficient R (defined below) in the range 0.8 to 1.2.

According to the invention, the porous support is advantageously in the form of beads, trilobes, extrudates, pellets, or irregular non-spherical agglomerates the specific form of which may result from a crushing step. Highly advantageously, said support is in the form of beads or extrudates. More advantageously, said support is in the form of beads.

The porous volume of the support is generally in the range 0.1 to 1.5 cm³/g, preferably in the range 0.5 to 1.3 cm³/g.

The alkali metal is generally selected from the group constituted by lithium, sodium, potassium, rubidium and caesium, preferably by lithium, sodium and potassium, and more preferably by sodium and potassium. Still more preferably, the alkali metal is sodium.

The alkaline-earth metal is generally selected from the group constituted by magnesium, calcium, strontium and barium, preferably from magnesium and calcium, and highly preferably from magnesium.

The alkali metal, when present, is distributed homogeneously across the support with a coefficient R in the range 0.8 to 1.2.

The alkaline-earth metal, when present, is distributed homogeneously across the support with a coefficient R in the range 0.8 to 1.2.

Definition of Coefficient R

Figure 1:
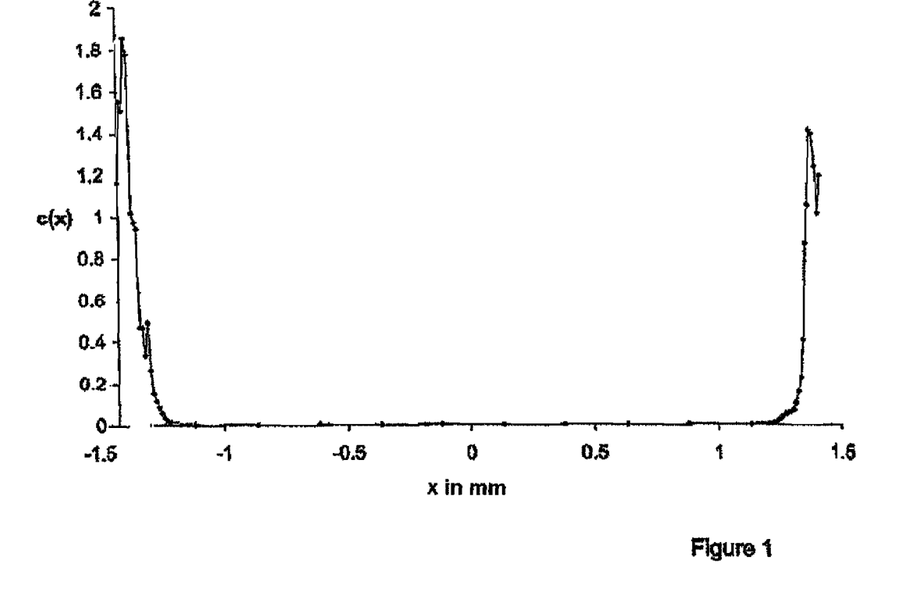
FIG. 1 shows an example of the profile obtained.

The distribution profiles for the elements in the catalyst grains are obtained by Castaing microprobe. At least 30 analysis points are recorded along the diameter of the bead or extrudate, in a proportion of about ten points on the crust of the active element (in this case palladium) and about ten points at the centre of the grain. This thereby produces the distribution profile c(x) for x∈[−r;+r] where c is the local concentration of the element, r is the radius of the bead or extrudate and x is the position of the analysis point along the diameter of the grain with respect to the centre of that grain.

The distribution of the elements is characterized by a dimensionless coefficient R which weights the local concentration by a weight which increases as a function of the position on the diameter. By definition:

$$R = \int_{-r}^{r} c(x) x^2 dx \bigg/ \frac{r^2}{3} \int_{-r}^{r} c(x) dx$$

Thus, an element with a uniform concentration has a coefficient R of 1, an element deposited in a dome profile (concentration at the core higher than the concentration at the edges of the support) has a coefficient of more than 1 and an element distributed in a crust profile (concentration at edges higher than the concentration at the core of the support) has a coefficient of less than 1. The analysis by Castaing microprobe produces values for the concentrations for a finite number of values of x, and so R is evaluated numerically using integration methods which are well known to the skilled person. Preferably, R is determined using the trapezium method.

The distribution of the alkali element is defined as being homogeneous when the distribution coefficient R as defined above is in the range 0.8 to 1.2.

The distribution of the alkaline-earth element is defined as being homogeneous when the distribution coefficient R as defined above is in the range 0.8 to 1.2.

Definition of Crust Thickness

When the palladium is distributed as a crust, its local concentration generally reduces gradually when it is measured starting from the edge of the catalytic grain towards the interior. A distance from the edge of the grain, at which the local palladium concentration becomes zero, can often not be determined accurately and reproducibly. In order to measure a crust thickness which is significant for the majority of palladium particles, the crust thickness is defined as the distance to the edge of the grain containing 80% of the element.

Starting from the distribution profile obtained by Castaing microprobe, the cumulative quantity Q(y) of the element in the grain is calculated as a function of the distance y to the edge of the grain.

For a bead:

$$Q(y) = \int_{-r}^{-y} c(x) 4\pi x^2 dx + \int_{y}^{r} c(x) 4\pi x^2 dx$$

For an extrudate:

$$Q(y) = \int_{-r}^{-y} c(x) 2\pi x dx + \int_{y}^{r} c(x) 2\pi x dx$$

Q(r) thus corresponds to the total quantity of the element in the grain. The following equation is then solved numerically for y:

$$\frac{Q(y)}{Q(r)} = 0.8$$

where c is a strictly positive function; Q is thus a strictly increasing function and this equation has a single solution which is the thickness of the crust.

Figure 2:
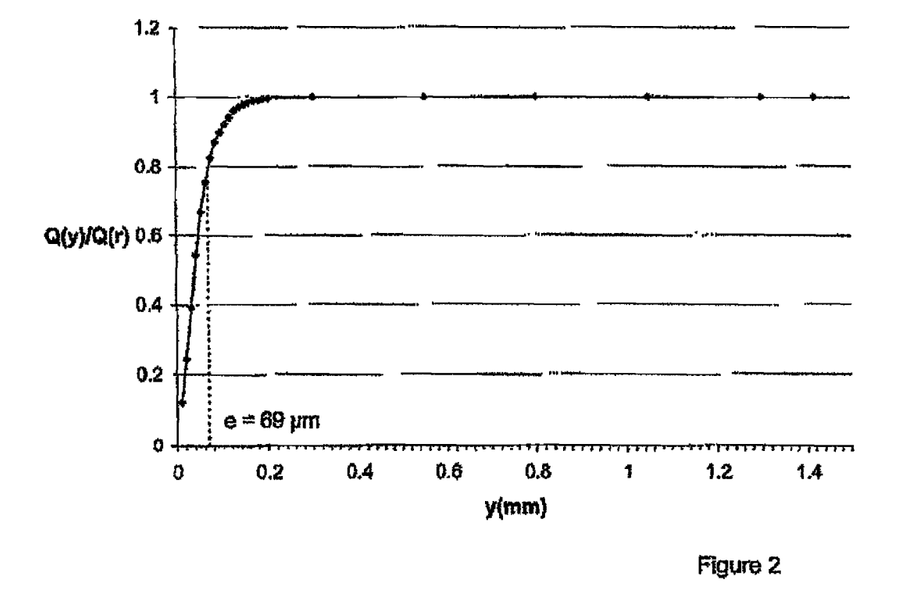

FIG. 2 shows an example of a cumulative quantity.

Definition of Palladium Particle Density

The palladium particle density is denoted De.

The metallic dispersion measurements are carried out by chemisorption of carbon monoxide CO onto the catalyst which has been reduced in 1 liter of hydrogen per hour per gram of catalyst, with a temperature ramp-up of 300° C./h and a constant temperature stage of two hours at 150° C. The catalyst is then flushed for 1 hour at 150° C. in helium then cooled to 25° C. in helium.

CO chemisorption is carried out dynamically at 25° C. using methods which are well known to the skilled person, resulting in a volume of chemisorbed CO, from which the skilled person can calculate the number of molecules of CO which have been chemisorbed.

A stoichiometric ratio of one molecule of CO per atom of Pd surface is assumed in order to calculate the number of atoms of surface Pd. The dispersion is expressed as the % of surface Pd atoms with respect to the total number of Pd atoms present in the catalyst sample.

The mean crystallite size is deduced from these dispersion measurements by application of the dispersion-particle size relationships known to the skilled person and described in "Analyse physico-chimique des catalyseurs industriels"

[Physico-Chemical Analysis of Industrial Catalysts], Chapter I, Editions Technip, Paris, 2001.

The number of Pd atoms per metallic particle as a function of the particle size is determined using the Van Hardeveld and Hartog model. (R Van Hardeveld, F Hartog, Surf Sci 15 (1969) 189).

In the case of a bead of support with volume Vt and radius r in which the palladium is present in the form of a crust with thickness e, the palladium particle density is obtained using the following formula:

$$De = \frac{(\% \, Pd).N_a}{S_{BET}.M_{Pd}.n_{Pd}.10^{14}} \frac{V_t}{V_c} \quad (1)$$

De: density of particles (as the number of palladium particles per $\mu m^2$);
% Pd: quantity of Pd by weight (grams of Pd per 100 grams of catalyst);
$N_a$: Avogadro's number ($6.022 \times 10^{23}$ atoms/mole);
$S_{BET}$: specific surface area of support (in $m^2/g$);
$M_{Pd}$: molar mass of palladium (106.42 g/mole);
$n_{Pd}$: number of palladium atoms per palladium particle;
$V_t$: total volume of support bead in $mm^3$;
$V_t = 4/3.\pi.r^3$ (r being the radius of the bead);
$V_c$: volume of crust in $mm^3$;
$V_c: V_t - 4/3.\pi.(r-e)^3$ (e being the thickness of the crust).

The skilled person can calculate the palladium particle density using a mathematical formula depending on the form of support under consideration. Thus, for a support the form of which is other than a bead, equation (1) is still valid, but the formulae for calculating $V_t$ and $V_c$ have to be adapted by the skilled person as a function of the geometry of the support.

Process for Preparing Catalyst

The invention also concerns a process for preparing a catalyst, comprising the following steps:
- a step a) for preparing, in an apparatus, a colloidal suspension of palladium oxide or palladium hydroxide in an aqueous phase by mixing an aqueous solution 1 comprising at least one hydroxide selected from the group constituted by alkali hydroxides and alkaline-earth hydroxides and an aqueous solution 2 comprising at least one palladium salt precursor, the solution 2 then the solution 1 being poured into the apparatus or solutions 1 and 2 being poured simultaneously into the apparatus, the preparation temperature being in the range 5° C. to 40° C., the pH of said colloidal suspension being in the range 1.0 to 3.5, the residence time for said colloidal suspension in the apparatus being in the range 0 to 20 hours;
- a step b) for preparing an impregnated support by impregnation of said colloidal suspension onto a support with a specific surface area in the range 50 to 210 $m^2/g$, the volume of the colloidal suspension being in the range 0.9 to 1.1 times the pore volume of the support;
- a step c) for preparing a catalyst precursor by maturing said impregnated support for between 0.5 and 40 hours;
- a step d) for preparing a dry precursor by drying said catalyst precursor obtained in step c) between 70° C. and 200° C., in air from combustion of a hydrocarbon, preferably methane, or in hot air, said air comprising in the range 0 to 80 grams of water per kg of air, a quantity of oxygen in the range 5% to 25% by volume and a carbon dioxide content in the range 0 to 10% by volume;
- a step e) for preparing a catalyst by calcining in hydrocarbon combustion air, preferably methane, of the dry precursor obtained in step d), the calcining temperature being in the range 300° C. to 500° C., said hydrocarbon combustion air comprising 40 to 80 grams of water per kg of combustion air, a quantity of oxygen in the range 5% to 15% by volume and a carbon dioxide content in the range 4% to 10% by volume;
- a step f) for reducing the catalyst obtained in step e), said reduction being carried out in the presence of gaseous hydrogen and at a temperature in the range 80° C. to 180° C.

In accordance with a first variation of this process, the pH, residence time for the colloidal suspension and the specific surface area of the support are fixed within their respective ranges. The palladium content, in the range 0.05% to 2% by weight, is then adjusted in order to obtain a palladium particle density in the crust in the range 1500 to 4100 particles of palladium per $\mu m^2$.

In accordance with a second variation of this process, the palladium content, in the range 0.05% to 2% by weight, the residence time for the colloidal suspension and the specific surface area of the support are fixed in their respective ranges. The pH is then adjusted in order to obtain a palladium particle density in the crust in the range 1500 to 4100 particles of palladium per $\mu m^2$.

a) Preparation of a Colloidal Suspension of Palladium Oxide or Palladium Hydroxide in Aqueous Phase The colloidal suspension is generally obtained by hydrolysis of the palladium cation in an aqueous medium, which results in the formation of particles of palladium oxides or hydroxides in suspension.

The aqueous solution of alkali hydroxides or alkaline-earth hydroxides is generally selected from the group constituted by aqueous solutions of sodium hydroxide and aqueous solutions of magnesium hydroxide; more preferably, the solution is an aqueous solution of sodium hydroxide.

The palladium precursor salt is generally selected from the group constituted by palladium chloride, palladium nitrate, and palladium sulphate. Highly preferably, the palladium precursor salt is palladium nitrate.

The aqueous solution 2 comprising at least one palladium precursor salt then the aqueous solution 1 comprising at least one alkali or alkaline-earth hydroxide are generally poured into the apparatus. Solutions 1 and 2 may be poured simultaneously into the apparatus. Preferably, the aqueous solution 2 then the aqueous solution 1 are poured into the apparatus.

The colloidal suspension generally remains in the apparatus for a residence time in the range 0 to 20 hours. The pH of the colloidal suspension may be modified during this residence time by adding quantities of acid or base which are compatible with the stability of the colloidal suspension.

In general, the preparation temperature is in the range 5° C. to 40° C., preferably in the range 15° C. to 35° C. The concentration of palladium is preferably in the range 5 to 150 millimoles per liter, more preferably in the range 8 to 80 millimoles per liter.

The concentrations of solutions 1 and 2 are generally selected in order to obtain a pH of the colloidal suspension in the range pH=1.0 to pH=3.5.

b) Deposit of Colloidal Suspension Prepared in Step a) by Impregnation onto a Support, Preferably onto Alumina The colloidal suspension prepared in step a) is then impregnated onto a support.

The support may optionally undergo a set of treatments prior to the impregnation step, such as calcining or hydration steps. The support may also already comprise one or more metallic elements prior to impregnation of the colloidal suspension. The metallic elements may also be introduced into the colloidal suspension. These metallic elements may be introduced either using conventional techniques or using the process of the present invention.

The colloidal suspension is preferably poured onto the support. This process may be carried out either batchwise, i.e. the step for preparing the colloidal suspension precedes the step for impregnation onto the support and the essential part of the colloidal suspension is sent all at once to the impregnation step, or continuously, i.e. the product obtained in step a) is sent continuously after adjusting the residence time for the colloidal suspension in step b).

An example of a continuous process which may be cited is a process where solutions 1 and 2 are poured simultaneously into a tank which continuously overflows into a zone comprising the support to be impregnated.

c) Maturing the Support Impregnated During Step b) for a Period in the Range 0.5 to 40 Hours After impregnation, the impregnated support is generally matured in the moist state for 0.5 to 40 hours, preferably for 1 to 30 hours.

d) Drying the Catalyst Precursor Obtained in Step c)

The catalyst precursor is generally dried in order to eliminate all or a portion of the water introduced during impregnation, preferably at a temperature in the range 50° C. to 250° C., more preferably in the range 70° C. to 200° C.

Drying is generally carried out in hydrocarbon combustion air, preferably methane or in heated air comprising 0 to 80 grams of water per kg of combustion air, with an oxygen content in the range 5% to 25% by volume and a carbon dioxide content in the range 0 to 10% by volume.

e) Calcining Dried Catalyst Obtained in Step d) in Combustion Air

After drying, the catalyst is generally calcined in combustion air, preferably air from the combustion of methane comprising 40 to 80 grams of water per kg of combustion air, an oxygen content in the range 5% to 15% by volume and a $CO_2$ content in the range 4% to 10% by volume. The calcining temperature is generally in the range 250° C. to 900° C., preferably in the range from approximately 300° C. to approximately 500° C. The calcining period is generally in the range 0.5 hours to 5 hours.

f) Reduction of Supported Oxide Obtained in Step e), Preferably Using Gaseous Hydrogen The catalyst is generally reduced. This step is preferably carried out in the presence of a reducing gas, either in situ, i.e. in the reactor where the catalytic transformation is carried out, or ex situ. Preferably, this step is carried out at a temperature in the range 80° C., to 180° C., more preferably in the range 100° C. to 160° C.

The reduction is carried out in the presence of a reducing gas comprising in the range 25% by volume to 100% by volume of hydrogen, preferably 100% by volume of hydrogen. The hydrogen is optionally supplemented by a gas which is inert as regards reduction, preferably argon, nitrogen or methane.

The reduction generally comprises a temperature ramp-up phase then a constant temperature stage.

The duration of the reduction constant temperature stage is generally in the range 1 to 10 hours, preferably in the range 2 to 8 hours.

The HSV is generally in the range 150 to 1000, preferably in the range 300 to 900 liters of reducing gas per hour per liter of catalyst.

In a variation, the catalyst may contain one or more promoter metals. The promoter metal or metals may be introduced during preparation of the support, onto the formed support, during step a) or at the end of steps b), c), d), e) or f).

The invention also concerns the catalyst obtained from the catalyst preparation processes described in the present invention.

Use of Catalyst of the Invention

The catalyst of the invention may be used in processes which involve transformation of organic compounds. Thus, the catalyst of the invention may be used in processes comprising reactions for hydrogenation of compounds comprising aromatic, ketone, aldehyde, acid or nitro functions, the hydrogenation of carbon monoxide into C1-C6 alcohols, into methanol or into dimethyl ether, isomerization or hydroisomerization reactions, hydrogenolysis, and in general reactions which involve cleavage or formation of carbon-carbon bonds.

The operating conditions generally used for said reactions are as follows: a temperature in the range 0° C. to 500° C., preferably in the range 25° C. to 350° C., a pressure in the range 0.1 to 20 MPa, preferably in the range 0.1 to 10 MPa, an hourly space velocity (HSV) in the range 0.1 to 50 $h^{-1}$, preferably in the range 0.5 to 20 $h^{-1}$ for a liquid feed; and in the range 500 to 30000 $h^{-1}$, preferably in the range 500 to 15000 $h^{-1}$, for a gaseous feed. When hydrogen is present, the molar ratio of the hydrogen to the feed is in the range 1 to 500 liters per liter, preferably in the range 10 to 150 liters per liter.

The use of the catalyst of the invention and the conditions for its use must be adapted by the user to the reaction and to the technology employed.

The catalyst of the invention may also be used in reactions for hydrogenation of compounds comprising acetylenic, dienic, olefinic functions.

The invention also concerns a process for selective hydrogenation by bringing a feed into contact with the catalyst of the invention or onto the catalyst prepared in accordance with the invention, said feed being selected from the group constituted by steam cracking C3 cuts, steam cracking C4 cuts, steam cracking C5 cuts and steam cracking gasolines, also termed pyrolysis gasolines.

In accordance with a preferred application, the catalysts of the invention are employed for reactions for selective hydrogenation of polyunsaturated hydrocarbon cuts derived from steam cracking and/or from catalytic cracking, preferably polyunsaturated hydrocarbon cuts derived from steam cracking.

Hydrogenation of C3 to C5 Cuts

Processes for conversion of hydrocarbons such as steam cracking or catalytic cracking are operated at high temperature and produce a wide variety of unsaturated molecules such as ethylene, propylene, straight chain butenes, isobutene, pentenes as well as unsaturated molecules containing up to approximately 15 carbon atoms.

At the same time, polyunsaturated compounds are also formed: acetylene, propadiene and methylacetylene (or propyne), 1-2 and 1-3-butadiene, vinylacetylene and ethylacetylene, and other polyunsaturated compounds with a boiling point corresponding to the C5+ gasoline fraction.

All of these polyunsaturated compounds have to be eliminated in order to allow these various cuts to be used in petrochemical processes such as in polymerization units.

Thus, for example, the C3 steam cracking cut may have the following mean composition: of the order of 90% by weight of propylene, of the order of 3% to 8% by weight of propadiene and methylacetylene, the remainder essentially being propane. In certain C3 cuts, between 0.1% and 2% by weight of C2 and C4 may also be present. The specifications concerning the concentrations of these polyunsaturated compounds for petrochemicals and polymerization units are very low: 20-30 ppm by weight of MAPD (methylacetylene and propadiene) for chemical quality propylene and less than 10 ppm by weight or even up to 1 ppm by weight for "polymerization" quality.

A C4 steam cracking cut has the following mean molar composition, for example: 1% of butane, 46.5% of butene, 51% of butadiene, 1.3% of vinylacetylene (VAC) and 0.2% of butyne. In certain C4 cuts, between 0.1% and 2% by weight of C3 and C5 may also be present. Here again, the specifications are strict: a diolefins content strictly below 10 ppm by weight for a C4 cut which will be used for petrochemicals or polymerization.

A steam cracking C5 cut will, for example, have the following mean composition by weight: 21% pentanes, 45% of pentenes, 34% of pentadienes.

The selective hydrogenation process has gradually imposed itself for eliminating polyunsaturated compounds from the cited C3 to C5 oil cuts as this process can convert the most unsaturated compounds into the corresponding alkenes, avoiding complete saturation and thus the formation of the corresponding alkanes.

Selective hydrogenation may be carried out in the gas or liquid phase, preferably in the liquid phase. A liquid phase reaction can in fact reduce the energy cost and increase the cycle time for the catalysts.

For a liquid phase reaction, the pressure is generally in the range 1 to 3 MPa, the temperature is in the range 2° C. to 50° C. and the hydrogen/(polyunsaturated compounds to be hydrogenated) molar ratio is in the range 0.1 to 4, preferably in the range 1 to 2.

For a gas phase hydrogenation reaction, the pressure is generally in the range 1 to 3 MPa, the temperature is in the range 40° C. to 120° C. and the hydrogen/(polyunsaturated compounds to be hydrogenated) molar ratio is in the range 0.1 to 4, preferably in the range 1 to 2.

Hydrogenation of Steam Cracking Gasolines

The steam cracking principally produces ethylene, propylene, a C4 cut as well as the steam cracking gasoline, also termed pyrolysis gasoline.

In accordance with another preferred mode, the feed is a pyrolysis gasoline. The pyrolysis gasoline corresponds to a cut with a boiling point which is generally in the range 0° C. to 250° C., preferably in the range 10° C. to 220° C. This feed generally comprises the C5-C12 cut with traces of C3, C4, C13, C14 and C15 (for example in the range 0.1% to 3% by weight for each of these cuts).

As an example, a C5-200° C. cut generally has the following composition as a % by weight:
Paraffins: 8-12
Aromatics: 58-62
Mono olefins: 8-10
Diolefins: 18-22
Sulphur: 20-300 ppm The selective hydrogenation of a pyrolysis gasoline consists of bringing the feed to be treated into contact with hydrogen introduced in excess in one or more reactors containing the hydrogenation catalyst.

The hydrogen flow rate is adjusted in order to have available a sufficient quantity to theoretically hydrogenate all of the diolefins, acetylenes and alkenyl aromatics and to keep an excess of hydrogen at the reactor outlet. In order to limit the temperature gradient in the reactor, it may be advantageous to recycle a fraction of the effluent to the inlet and/or to the centre of the reactor.

In the case of selective hydrogenation of pyrolysis gasoline, the hydrogen/(polyunsaturated compounds to be hydrogenated) molar ratio is generally in the range 1 to 2, the temperature is generally in the range 40° C. to 200° C., preferably in the range 50° C. to 180° C., the hourly space velocity (corresponding to the volume of hydrocarbon per volume of catalyst per hour) is generally in the range $0.5 \, h^{-1}$ to $10 \, h^{-1}$, preferably in the range $1 \, h^{-1}$ to $5 \, h^{-1}$, and the pressure is generally in the range 1.0 MPa to 6.5 MPa, preferably in the range 2.0 MPa to 3.5 MPa.

EXAMPLES

The colloidal suspensions were prepared at 25° C. in all of the examples below.

Example 1

Catalyst A, not in Accordance

An aqueous solution of palladium nitrate $Pd(NO_3)_2$ was prepared at 25° C. by diluting 3.5 g of a solution of palladium nitrate $Pd(NO_3)_2$ containing 8.5% by weight of palladium with demineralized water to a volume which corresponded to the pore volume of the alumina support. The pH of the solution was 0.7.

This solution was then impregnated onto 100 grams of a $\delta$-$Al_2O_3$ type alumina with a $S_{BET}$ of 130 m²/g. This alumina was in the form of beads with a mean diameter of 3 mm.

Catalyst A obtained was dried in air at 120° C., then dried for 2 hours at 450° C. in a stream of combustion air with an hourly space velocity of 500 liters of combustion air per liter of catalyst per hour. The combustion air contained approximately 60 g of water per kg of air, 10% by volume of oxygen and 7% by volume of carbon dioxide. Catalyst A contained 0.3% Pd.

Characterization of the catalyst by Castaing microprobe showed that 80% of the Pd was located in a crust with a thickness of 250 µm.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.365 ml/g, i.e. a metallic dispersion of 53%, which corresponded to a mean particle size of 2.3 nm, i.e. 440 atoms of Pd/particle.

These data meant that a mean Pd particle density of the order of 697 particles of Pd/µm² of crust could be calculated.

Example 2a

Catalyst Ba (not in Accordance)

The residence time for the colloidal suspension in the apparatus before impregnation was 15 minutes for Examples 2a, 2b and 3 below.

A colloidal suspension of Pd oxide was prepared with stirring at 25° C. by diluting 3.5 g of a solution of palladium nitrate $Pd(NO_3)_2$ containing 8.5% by weight of palladium Pd with approximately 20 ml of demineralized water, then adding approximately 10 ml of a solution of sodium hydroxide to arrive at a pH of 1.6. The suspension was then diluted with demineralized water to a volume which corresponded to the pore volume of the alumina support.

This solution was then impregnated onto 59 grams of a $\delta$-$Al_2O_3$ type alumina with a $S_{BET}$ of 130 m²/g. This alumina was in the form of beads with a mean diameter of 3 mm.

Catalyst Ba obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst Ba contained 0.5% Pd.

Characterization of the catalyst by Castaing microprobe allowed a crust thickness of approximately 91 µm to be calculated. The Na was distributed over the whole bead with a distribution coefficient R(Na)=0.7, which meant that the sodium was distributed in a non-homogeneous manner.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.583 ml/g, i.e. a metallic dispersion of 51%, which corresponded to a mean particle size of 2.4 nm, i.e. 490 atoms of Pd/particle.

These data meant that a mean Pd particle density of the order of 2604 particles of Pd/µm$^2$ of crust could be calculated.

Example 2b

Catalyst Bb (not in Accordance)

In order to dry impregnate 59 g of alumina, a colloidal suspension of Pd oxide was prepared with stirring at 25° C. by diluting 3.5 g of a palladium nitrate Pd(NO$_3$)$_2$ solution containing 8.5% by weight of palladium Pd with approximately 10 ml of demineralized water, then adding to approximately 20 ml of a sodium hydroxide solution to arrive at a pH of 12.1. The suspension was then diluted with demineralized water to a volume which corresponded to the pore volume of the alumina support.

This solution was then impregnated onto 59 g of a δ-Al$_2$O$_3$ type alumina with a $S_{BET}$ of 130 m$^2$/g. This alumina was in the form of beads with a mean diameter of 3 mm.

Catalyst Bb obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst Bb contained 0.5% Pd.

Characterization of the catalyst by Castaing microprobe showed that 80% of the Pd was located on a crust with a thickness of approximately 74 µm. The Na was distributed in a non-homogeneous manner with a distribution coefficient R(Na)=0.65.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.551 ml/g, i.e. a metallic dispersion of 48%, which corresponded to a mean particle size of 2.5 nm, i.e. approximately 536 atoms of Pd/particle.

These data meant that a mean Pd particle density of the order of 2894 particles of Pd/µm$^2$ of crust could be calculated.

Example 3

Catalyst C (not in Accordance)

A colloidal suspension of Pd oxide was prepared with stirring at 25° C. by diluting 3.5 g of a solution of palladium nitrate Pd(NO$_3$)$_2$ containing 8.5% by weight of palladium Pd with, approximately 20 ml of demineralized water, then adding approximately 10 ml of a sodium hydroxide solution to arrive at a pH of 1.7. The suspension was then diluted with demineralized water to a volume which corresponded to a pore volume of 59 g for the alumina support.

This solution was then impregnated onto 59 g of a δ-Al$_2$O$_3$ type alumina with a $S_{BET}$ of 130 m$^2$/g. This alumina was in the form of beads with a mean diameter of 3 mm.

A maturation step for the impregnated support was carried out before drying in air in a confined moist medium, for a period of 20 hours.

Catalyst C obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst C contained 0.5% Pd.

Characterization of the catalyst by Castaing microprobe showed that 80% of the Pd was located on a crust with a thickness of approximately 75 µm.

The Na was distributed over the whole bead with a distribution coefficient R(Na)=0.99, which gave a homogeneous Na distribution over the whole bead with no excess Na in the crust.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.576 ml/g, i.e. a metallic dispersion of 50%, which corresponded to a mean particle size of 2.4 nm, i.e. 490 atoms of Pd/particle.

These data meant that a mean Pd particle density of the order of 3125 particles of Pd/µm$^2$ of crust could be calculated.

Example 4

Catalytic Test for Hydrogenation of a Styrene-Isoprene Mixture in the Presence of S Before the catalytic test, 2 g of the various catalysts prepared in Examples 1 to 3 were treated in a stream of 1 liter of hydrogen per hour per gram of catalyst with a temperature ramp-up of 300° C./h and a constant temperature stage at 150° C. for 2 hours.

The catalysts then underwent a hydrogenation test in a perfectly stirred "Grignard" type batch reactor. To this end, the beads of reduced catalyst were fixed, in the absence of air, in an annular basket located around a moving agitator. The baskets used in the reactors were of the Robinson Mahonnay type.

Hydrogenation was carried out in the liquid phase.

The composition of the feed was as follows: 8% by weight of styrene, 8% by weight of isoprene, 10 ppm of S introduced in the form of pentanethiol, 100 ppm of S introduced in the form of thiophene, the solvent being n-heptane.

The test was carried out at a constant pressure of 3.5 MPa of hydrogen and at a temperature of 45° C. The reaction products were analyzed by gas chromatography.

The catalytic activities were expressed in moles of $H_2$ consumed per minute and per mole of accessible Pd and are shown in Table 1.

TABLE 1

Measured activities for hydrogenation of a styrene-isoprene mixture in the presence of sulphur.

|  | Activity * |
|---|---|
| Catalyst A (not in accordance) | 76 |
| Catalyst Ba (not in accordance) | 140 |
| Catalyst Bb (not in accordance) | 110 |
| Catalyst C (in accordance with the invention) | 177 |

* in (moles $H_2$)/[min × (mole of accessible Pd)]

Catalysts Ba and Bb which had a Pd particle density included in the defined range had an intrinsic catalytic activity which was substantially higher than that of the catalyst A with a Pd particle density which is smaller than the defined range.

Catalyst C which had both a density included in the defined range and a Na distribution in the bead which was homogeneous, had a substantially superior catalytic activity than that of the activity of catalysts Ba and Bb the particle density of which is included in the defined range but with a Na distribution which was not homogeneous through the catalyst bead.

Example 5

Catalyst D (not in Accordance)

The residence time for the colloidal suspension in the apparatus before impregnation was 30 minutes for Examples 5 to 8.

A colloidal suspension of Pd oxide was prepared with stirring at 25° C. by diluting 0.58 g of a solution of palladium nitrate $Pd(NO_3)_2$ containing 8.5% by weight of palladium Pd with approximately 35 ml of demineralized water, then adding approximately 10 ml of a sodium hydroxide solution to arrive at a pH of 2.3. The suspension was then diluted with demineralized water to a volume which corresponded to the pore volume of the alumina support.

This solution was then impregnated onto 90 g of a $\delta$-$Al_2O_3$ type alumina with a $S_{BET}$ of 130 m$^2$/g. This alumina was in the form of beads with a mean diameter of 3 mm.

A maturation step for the impregnated support was carried out before drying in air in a confined moist medium, for a period of 20 hours.

Catalyst D obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst D contained 0.055% Pd.

Characterization of the catalyst by Castaing microprobe showed that 80% of the Pd was located on a crust with a thickness of approximately 27 µm. The Na was distributed homogeneously with a distribution coefficient R(Na)=0.89.

Before, chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.071 ml/g, i.e. a metallic dispersion of 56%, which corresponded to a mean particle size of 2.1 nm, i.e. 340 atoms of Pd/particle.

These data meant that a mean Pd particle density of the order of 1322 particles of Pd/µm$^2$ of crust could be calculated.

Example 6

Catalyst E (in Accordance)

A colloidal suspension of Pd oxide was prepared with stirring at 25° C. by diluting 1.16 g of a solution of palladium nitrate $Pd(NO_3)_2$ containing 8.5% by weight of palladium Pd with approximately 40 ml of demineralized water, then adding approximately 10 ml of a sodium hydroxide solution to arrive at a pH of 2.3. The suspension was then diluted with demineralized water to a volume which corresponded to the pore volume of the alumina support.

This solution was then impregnated onto 102 g of a $\delta$-$Al_2O_3$ type alumina with a $S_{BET}$ of 130 m$^2$/g. This alumina was in the form of beads with a mean diameter of 3 mm.

A maturation step for the impregnated support was carried out before drying in air in a confined moist medium, for a period of 20 hours.

Catalyst E obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst E contained 0.097% Pd.

Characterization of the catalyst by Castaing microprobe showed that 80% of the Pd was located on a crust with a thickness of approximately 30 µm. The Na was distributed homogeneously with a distribution coefficient R(Na)=0.85.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.127 ml/g, i.e. a metallic dispersion of 57%, which corresponded to a mean particle size of 2.1 nm, i.e. 340 atoms of Pd/particle.

These data meant that a mean Pd particle density of the order of 2103 particles of Pd/µm$^2$ of crust could be calculated.

Example 7

Catalyst F (in Accordance)

A colloidal suspension of Pd oxide was prepared with stirring at 25° C. by diluting 2.3 g of a solution of palladium nitrate $Pd(NO_3)_2$ containing 8.5% by weight of palladium Pd with approximately 45 ml of demineralized water, then adding approximately 10 ml of a sodium hydroxide solution to arrive at a pH of 2.4. The suspension was then diluted with demineralized water to a volume which corresponded to the pore volume of the alumina support.

This solution was then impregnated onto 111 g of a $\delta$-$Al_2O_3$ type alumina with a $S_{BET}$ of 130 m²/g. This alumina was in the form of beads with a mean diameter of 3 mm.

A maturation step for the impregnated support was carried out before drying in air in a confined moist medium, for a period of 20 hours.

Catalyst F obtained was dried in air at an HSV of 500 liters of air per liter of catalyst per hour, with a temperature, ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst F contained 0.176% Pd.

Characterization of the catalyst by Castaing microprobe showed that 80% of the Pd was located on a crust with a thickness of approximately 31 µm. The Na was distributed homogeneously with a distribution coefficient R(Na)=0.92.

Before chemisorption of CO and the catalytic test, the catalyst was finally reduced in a stream, of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.231 ml/g, i.e. a metallic dispersion of 57%, which corresponded to a mean particle size of 2.1 µm, i.e. 340 atoms of Pd/particle.

These data meant that a mean Pd particle density of the order of 3707 particles of Pd/µm² of crust could be calculated.

Example 8

Catalyst G (not in Accordance)

A colloidal suspension of Pd oxide was prepared with stirring at 25° C. by diluting 3.45 g of a solution of palladium nitrate $Pd(NO_3)_2$ containing 8.5% by weight of palladium Pd with approximately 55 ml of demineralized water, then adding approximately 10 ml of a sodium hydroxide solution to arrive at a pH of 2.4. The suspension was then diluted with demineralized water to a volume which corresponded to the pore volume of the alumina support.

This solution was then impregnated onto 133 g of a $\delta$-$Al_2O_3$ type alumina with a $S_{BET}$ of 130 m²/g. This alumina was in the form of beads with a mean diameter of 3 mm.

A maturation step for the impregnated support was carried out before drying in air in a confined moist medium, for a period of 20 hours.

Catalyst G obtained was dried in air at an HSV of 500 liters of air per liter of catalyst per hour, with a temperature ramp-up from 25° C. to 120° C. over 8 hours, followed by a constant temperature stage of 2 hours at 120° C. The catalyst was then calcined in a stream of combustion air at an HSV of 500 liters of combustion air per liter of catalyst per hour, with a temperature ramp-up of approximately 300° C. per hour followed by a constant temperature stage at 450° C. lasting 2 hours. The combustion air contained approximately 60 g of water per kg of air, 10% by volume of oxygen and 7% by volume of carbon dioxide.

Catalyst G contained 0.22% Pd.

Characterization of the catalyst by Castaing microprobe showed that 80% of the Pd was located on a crust with a thickness of approximately 30 µm. The Na was distributed in a non-homogeneous manner with a distribution coefficient R(Na)=0.88.

Before chemisorption of CO and the catalytic test, the catalyst was finally reduced in a stream of hydrogen with an HSV of 500 liters of hydrogen per liter of catalyst per hour, with a temperature ramp-up of 300° C./h and a constant temperature stage at 150° C. for 2 hours.

The volume of chemisorbed CO was 0.287 ml/g, i.e. a metallic dispersion of 57%, which corresponded to a mean particle size of 2.1 nm, i.e. 340 atoms of Pd/particle.

These data meant that a mean Pd particle density of the order of 4790 particles of Pd/µm² of crust could be calculated.

Example 9

Catalytic Test for Hydrogenation of 1,3-Butadiene

Before the catalytic test, approximately 0.5 g of the various catalysts prepared in Examples 5 to 8 were ground to a granulometry of 63-100 microns then treated in a stream of 1 liter of hydrogen per hour per gram of catalyst with a temperature ramp-up of 300° C./h and a constant temperature stage at 150° C. for 2 hours.

The catalysts then underwent a hydrogenation test in a perfectly stirred "Grignard" type batch reactor.

Hydrogenation was carried out in the liquid phase.

The composition of the feed was: 6.3% by weight of 1,3-butadiene, the solvent being n-heptane. The test is being carried out at a constant pressure of 0.5 MPa of hydrogen at a temperature of 5° C.

The reaction products were analyzed by gas chromatography. The catalytic activities were expressed in moles of $H_2$ consumed per second per mole of accessible Pd and are shown in Table 2.

TABLE 2

Measured activities for hydrogenation of 1,3-butadiene.

| | Activity * |
|---|---|
| Catalyst D (not in accordance) | 15 |
| Catalyst E (in accordance with the invention) | 33 |
| Catalyst F (in accordance with the invention) | 31 |
| Catalyst G (not in accordance) | 23 |

* in (moles $H_2$)/[s × (mole of surface metal)]

Catalysts E and F which had a particle density included in the defined range had an intrinsic catalytic activity which was higher by a factor of 2 than that of catalyst D with a Pd particle density which was below the defined range, and higher by a factor of 1.5 than catalyst G with a Pd particle density which was higher than the defined range.

The invention claimed is:

1. A catalyst comprising palladium, at least one alkali metal or alkaline-earth metal, and a porous support in the form of beads or extrudates, comprising at least one refractory oxide that is silica, alumina or silica-alumina, wherein the specific surface area of the porous support is in the range of 50 to 210 m²/g, the palladium content in the catalyst is in the range of 0.05% to 2% by weight, at least 80% by weight of the palladium is distributed in a crust at the periphery of the support, the thickness of said crust being in the range of 20 to 200 μm, the metallic dispersion D is in the range of 25% to 70%; the density of the palladium particles in the crust is in the range of 1500 to 4100 particles of palladium per μm$^2$, the sum of the quantities of alkali and/or alkaline-earth metals in the catalyst is in the range of 0.05% to 5% by weight and said alkali and/or alkaline-earth metal is distributed homogeneously across the support, with a coefficient R in the range of 0.8 to 1.2, $$R = \int_{-r}^{r} c(x)x^2 dx \bigg/ \frac{r^2}{3} \int_{-r}^{r} c(x)dx$$

where c is the local concentration of the element, r is the radius of the beads or extrudates and x is the position of the analysis point along the diameter of the grain with respect to the center of that grain.

2. A catalyst according to claim 1, wherein said porous support is alumina and is in the form of beads or extrudates.

3. A catalyst according to claim 2, wherein said porous support is in the form of beads.

4. A catalyst according to claim 1, wherein said alkali metal is sodium.

5. A catalyst according to claim 1, wherein the specific surface area of said porous support is in the range of 100 to 160 m$^2$/g, the quantity of palladium in the catalyst is in the range of 0.1% to 0.8% by weight, at least 80% by weight of the palladium is distributed in a crust at the periphery of the support with a thickness in the range of 20 to 110 μm, the metallic dispersion D is in the range of 35% to 60%, and the palladium particle density in the crust is in the range of 1600 to 3950 particles of palladium per μm$^2$.

6. A process for preparing a catalyst according to claim 1, comprising:
   a) preparing, in an apparatus, a colloidal suspension of palladium oxide or palladium hydroxide in an aqueous phase by mixing an aqueous solution 1 comprising at least one hydroxide selected from the group constituted by alkali hydroxides and alkaline-earth hydroxides and an aqueous solution 2 comprising at least one precursor salt of palladium, pouring the solution 2 then the solution 1 into the apparatus or pouring solutions 1 and 2 simultaneously into the apparatus, the preparation temperature being in the range of 5° C. to 40° C., the pH of said colloidal suspension being in the range of 1.0 to 3.5, the residence time for the colloidal suspension in the apparatus being in the range of 0 to 20 hours;
   b) preparing an impregnated support by impregnating said colloidal suspension onto a support with a specific surface area in the range of 50 to 210 m$^2$/g, the volume of the colloidal suspension being in the range of 0.9 to 1.1 times the pore volume of the support;
   c) preparing a catalyst precursor by aging said impregnated support for between 0.5 and 40 hours;
   d) preparing a dry precursor by drying said catalyst precursor obtained in c) at between 70° C. and 200° C. in air from combustion of a hydrocarbon or in heated air, said air comprising 0 to 80 grams of water per kilogram of air, a quantity of oxygen in the range of 5% to 25% by volume and a quantity of carbon dioxide in the range of 0 to 10% by volume;
   e) preparing a catalyst by calcining, in air from combustion of a hydrocarbon, of the dry precursor obtained in d), the calcining temperature being in the range of 300° C. to 500° C., said hydrocarbon combustion air comprising in the range 40 to 80 grams of water per kg of combustion air, a quantity of oxygen in the range of 5% to 15% by volume and a quantity of carbon dioxide in the range of 4% to 10% by volume;
   f) reducing the catalyst obtained in e), said reduction being carried out in the presence of a reducing gas at a temperature in the range of 80° C. to 180° C.;
and wherein:
   either said pH, said residence time for the colloidal suspension, said specific surface area of the support are fixed within their respective ranges, with the palladium content in the range of 0.05% to 2% by weight being adjusted in order to obtain a palladium particle density in the crust in the range of 1500 to 4100 particles of palladium per μm$^2$;
   or the palladium content is in the range of 0.05% to 2% by weight, said residence time for the colloidal suspension, and said specific surface area of the support are fixed within their respective ranges, with said pH being adjusted in order to obtain a palladium particle density in the crust in the range of 1500 to 4100 particles of palladium per μm$^2$.

7. A preparation process according to claim 6, wherein in a), the palladium precursor salt is palladium chloride, palladium nitrate or palladium sulphate.

8. A catalyst obtained by the preparation process of claim 6.

9. A process for selective hydrogenation, comprising bringing a feed into contact with the catalyst according to claim 1, wherein said feed being C3 steam cracking cuts, C4 steam cracking cuts, C5 steam cracking cuts or steam cracking gasolines.

10. A process according to claim 9, wherein the feed is a steam cracking gasoline, the hydrogen/(polyunsaturated compounds to be hydrogenated) molar ratio is in the range of 1 to 2, the temperature is in the range of 40° C. to 200° C., the hourly space velocity is in the range of 0.5 h$^{-1}$ to 10 h$^{-1}$ and the pressure is in the range of 1.0 MPa to 6.5 MPa.

11. A selective hydrogenation process comprising bringing a feed into contact with the catalyst according to claim 1, wherein said feed comprising aromatic, ketone, aldehyde, acid and/or nitro functions.

12. A process according to claim 11 conducted at a temperature in the range of 0° C. to 500° C., a pressure in the range of 0.1 to 20 MPa, and an hourly space velocity in the range of 0.1 to 50 h$^{-1}$ for a liquid feed, and between 500 and 30000 h$^{-1}$ for a gaseous feed.

13. A process for the hydrogenation of carbon monoxide to C1-C6 alcohols, methanol or dimethylether, comprising bringing a feed into contact with the catalyst according to claim 1.

14. A process for isomerization, hydroisomerization or hydrogenolysis, comprising bringing a feed into contact with the catalyst according to claim 1.

* * * * *

UNITED STATES PATENT AND TRADEMARK OFFICE
CERTIFICATE OF CORRECTION

PATENT NO.       : 8,637,719 B2
APPLICATION NO.  : 12/740240
DATED            : January 28, 2014
INVENTOR(S)      : Fischer et al.

Page 1 of 1

It is certified that error appears in the above-identified patent and that said Letters Patent is hereby corrected as shown below:

Title Page, item (73) reads:
Assignee: "IFP Energies nouvelles,
Reuil-Malmaison, Cedex (FR)" should read -- IFP Energies nouvelles,
Rueil-Malmaison, Cedex (FR) --

Signed and Sealed this
Third Day of June, 2014

Michelle K. Lee
*Deputy Director of the United States Patent and Trademark Office*